United States Patent
Lim et al.

(10) Patent No.: US 11,375,107 B2
(45) Date of Patent: Jun. 28, 2022

(54) APPARATUS AND METHOD FOR GUIDING MULTI-VIEW CAPTURE

(71) Applicant: ELECTRONICS AND TELECOMMUNICATIONS RESEARCH INSTITUTE, Daejeon (KR)

(72) Inventors: Seong-Jae Lim, Daejeon (KR); Ki-Nam Kim, Daejeon (KR); Tae-Joon Kim, Sejong-si (KR); Seung-Uk Yoon, Daejeon (KR); Seung-Wook Lee, Daejeon (KR); Bon-Woo Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/085,077

(22) Filed: Oct. 30, 2020

(65) Prior Publication Data
US 2021/0136280 A1 May 6, 2021

(30) Foreign Application Priority Data
Oct. 30, 2019 (KR) .......................... 10-2019-0136642

(51) Int. Cl.
*H04N 5/232* (2006.01)
*H04N 13/275* (2018.01)
(52) U.S. Cl.
CPC ....... *H04N 5/23222* (2013.01); *H04N 13/275* (2018.05)

(58) Field of Classification Search
USPC .......................................................... 348/46
See application file for complete search history.

(56) References Cited

U.S. PATENT DOCUMENTS

| 6,614,429 B1 * | 9/2003 | Zhang ................... G06K 9/209 345/420 |
| 9,786,064 B2 | 10/2017 | Um et al. |
| 10,176,404 B2 | 1/2019 | Boulkenafed et al. |
| 2010/0158354 A1 | 6/2010 | Kim et al. |

(Continued)

FOREIGN PATENT DOCUMENTS

| JP | 2012-208759 A | 10/2012 |
| KR | 10-1514346 B1 | 4/2015 |

(Continued)

*Primary Examiner* — Behrooz M Senfi
(74) *Attorney, Agent, or Firm* — Rabin & Berdo, P.C.

(57) ABSTRACT

Disclosed herein are an apparatus and method for guiding multi-view capture. The apparatus for guiding multi-view capture includes one or more processors and an execution memory for storing at least one program that is executed by the one or more processors, wherein the at least one program is configured to receive a single-view two-dimensional (2D) image obtained by capturing an image of an object of interest through a camera, generate an orthographic projection image and a perspective projection image for the object of interest from the single-view 2D image using an image conversion parameter that is previously learned from multi-view 2D images for the object of interest, generate a 3D silhouette model for the object of interest using the orthographic projection image and the perspective projection image, and output the 3D silhouette model and a guidance interface for the 3D silhouette model.

8 Claims, 7 Drawing Sheets

(56) References Cited

U.S. PATENT DOCUMENTS

2018/0359416 A1* 12/2018 Hold-Geoffroy .... G06N 3/0454
2019/0122424 A1* 4/2019 Moore ...................... G06T 7/50
2020/0234424 A1* 7/2020 Holzer ............... G06Q 30/0278

FOREIGN PATENT DOCUMENTS

KR    10-2016-0093759 A    8/2016
KR    10-1906431 B1    10/2018

* cited by examiner

APPARATUS AND METHOD FOR GUIDING MULTI-VIEW CAPTURE

CROSS REFERENCE TO RELATED APPLICATION

This application claims the benefit of Korean Patent Application No. 10-2019-0136642, filed Oct. 30, 2019, which is hereby incorporated by reference in its entirety into this application.

BACKGROUND OF THE INVENTION

1. Technical Field

The present invention relates generally to technology for guiding multi-view capture, and more particularly to a method and apparatus for automatically guiding multi-view object capture using one camera so as to precisely measure an object and reconstruct a three-dimensional (3D) object.

2. Description of the Related Art

Existing methods for capturing an accurate multi-view image in multi-view image-based 3D object reconstruction may include a method for previously positioning multiple cameras and performing pre-calibration and a method for placing a capture-target object at the center of space and capturing multi-view images of the capture-target object while rotating a camera along a circular path. In the case of mobile devices, silhouette information suitable for a target object may be provided to a user, and thus a simple guide for multi-view capture may be provided.

When multiple cameras are positioned or rotated, it is inconvenient to capture images through the cameras, and the sizes of the target object captured from respective viewpoints may be different from each other depending on the location of the target object. Inaccurate capture may be performed due to shaking, tilting or the like of the object even when a simple silhouette is provided.

The present invention proposes an apparatus and method for guiding multi-view capture, which can easily and conveniently capture a multi-view image by providing suitable guiding, such as camera tilting, to a user through real-time processing.

Meanwhile, Korean Patent No. 10-1906431, entitled "Method and System for 3D Modeling Based on 2D Image Recognition", discloses a method and system which can acquire a 2D image suitable for 3D modeling with respect to a 2D image and generate a 3D model using the acquired 2D image.

SUMMARY OF THE INVENTION

Accordingly, the present invention has been made keeping in mind the above problems occurring in the prior art, and an object of the present invention is to measure the appearance of an object of interest, precisely measure the object of interest, and provide 3D reconstruction from an image acquired through a camera.

Another object of the present invention is to provide a method and apparatus for guiding capture from other viewpoints based on the view (viewpoint) of an initially captured image.

A further object of the present invention is to support capture guidance so that a user can easily and accurately capture a multi-view image through capture guidance.

Still another object of the present invention is to improve multi-view capture-guiding performance based on machine learning.

In accordance with an aspect of the present invention to accomplish the above objects, there is provided an apparatus for guiding multi-view capture, including one or more processors and an execution memory for storing at least one program that is executed by the one or more processors, wherein the at least one program is configured to receive a single-view two-dimensional (2D) image obtained by capturing an image of an object of interest through a camera, generate an orthographic projection image and a perspective projection image for the object of interest from the single-view 2D image using an image conversion parameter that is previously learned from multi-view 2D images for the object of interest, generate a 3D silhouette model for the object of interest using the orthographic projection image and the perspective projection image, and output the 3D silhouette model and a guidance interface for the 3D silhouette model.

The at least one program may be configured to receive the multi-view 2D image and then learn parameters for generating the 3D silhouette model.

The at least one program may be configured to receive multi-view 2D images of the object of interest through the camera, learn a conversion parameter between projection images, learn prediction of a multi-view orthographic projection silhouette, and learn lighting, and then generate learning parameters.

The at least one program may be configured to predict silhouettes of 2D images from remaining views based on the single-view 2D image using a multi-view silhouette prediction parameter that is previously learned from the multi-view 2D images for the object of interest, and to generate the 3D silhouette model using the predicted silhouettes.

The at least one program may be configured to predict a multi-view silhouette from an orthographic projection front image (i.e., an initial view orthographically-projected front image) using an orthographic projection silhouette prediction parameter that is previously learned from the multi-view 2D images for the object of interest.

The at least one program may be configured to convert the predicted multi-view orthographic projection silhouette back into a perspective projection silhouette so as to display the predicted multi-view orthographic projection silhouette on the camera.

The at least one program may be configured to display a multi-view silhouette image projected in perspective under a viewpoint-adjusted lighting environment, generated by inferring conversion of lighting, on the display, thus guiding the multi-view silhouette image projected in perspective.

The at least one program may be configured to correct a lighting value of the single-view 2D image to a lighting value falling within a preset difference range using a lighting conversion parameter that is previously learned from the multi-view 2D images for the object of interest.

The at least one program may be configured to calculate a tilt degree value and a tilt direction value of the camera using gyroscope information of the camera.

The at least one program may be configured to output the guidance interface for the 3D silhouette model based on the tilt degree value and the tilt direction value of the camera In accordance with another aspect of the present invention to accomplish the above objects, there is provided a method for guiding multi-view capture, the method being performed by an apparatus for guiding multi-view capture, the method including receiving a single-view 2D image obtained by capturing an image of an object of interest through a camera, generating an orthographic projection image and a perspective projection image for the object of interest from the single-view 2D image using an image conversion parameter that is previously learned from multi-view 2D images for the object of interest, and generating a 3D silhouette model for the object of interest using the orthographic projection image and the perspective projection image, and outputting the 3D silhouette model and a guidance interface for the 3D silhouette model.

Here, the method may further include receiving the multi-view 2D image and then learning parameters for generating the 3D silhouette model.

Here, learning the parameters may be configured to receive multi-view 2D images of the object of interest through the camera, learn a conversion parameter between projection images, learn prediction of a multi-view orthographic projection silhouette, and learn lighting, and then generate learning parameters.

Generating the 3D silhouette model may be configured to predict silhouettes of 2D images from remaining views based on the single-view 2D image using a multi-view silhouette prediction parameter that is previously learned from the multi-view 2D images for the object of interest, and to generate the 3D silhouette model using the predicted silhouettes.

Generating the 3D silhouette model may be configured to correct a lighting value of the single-view 2D image to a lighting value falling within a preset difference range using a lighting conversion parameter that is previously learned from the multi-view 2D images for the object of interest.

Generating the 3D silhouette model may be configured to predict a multi-view silhouette from an orthographic projection front image (i.e., an initial view orthographically-projected front image) using an orthographic projection silhouette prediction parameter that is previously learned from the multi-view 2D images for the object of interest.

Generating the 3D silhouette model may be configured to convert the predicted multi-view orthographic projection silhouette back into a perspective projection silhouette so as to display the predicted multi-view orthographic projection silhouette on the camera.

Generating the 3D silhouette model may be configured to display a multi-view silhouette image projected in perspective under a viewpoint-adjusted lighting environment, generated by inferring conversion of lighting, on the display, thus guiding the multi-view silhouette image projected in perspective.

Generating the 3D silhouette model may be configured to calculate a tilt degree value and a tilt direction value of the camera using gyroscope information of the camera.

Outputting the 3D silhouette model and the guidance interface may be configured to output the guidance interface for the 3D silhouette model based on the tilt degree value and the tilt direction value of the camera.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, preferred embodiments of the present invention will be described in detail with the attached drawings.

Figure 1:
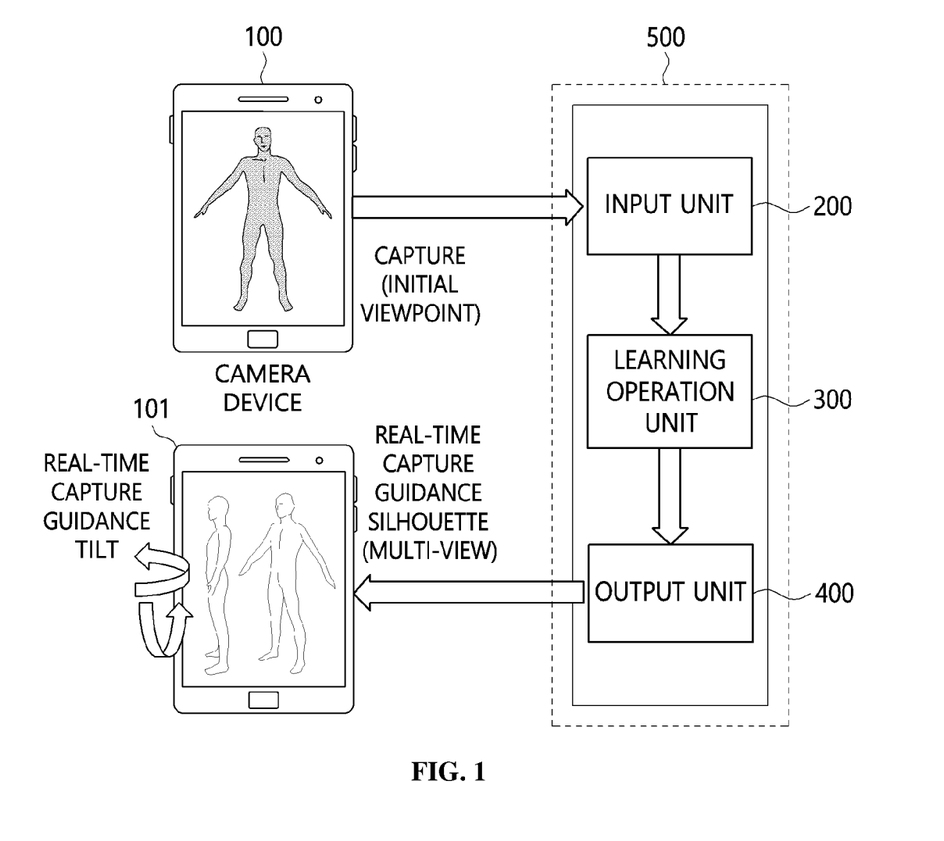
FIG. 1 is a block diagram illustrating an apparatus for guiding multi-view capture according to an embodiment of the present invention.
Figure 2:
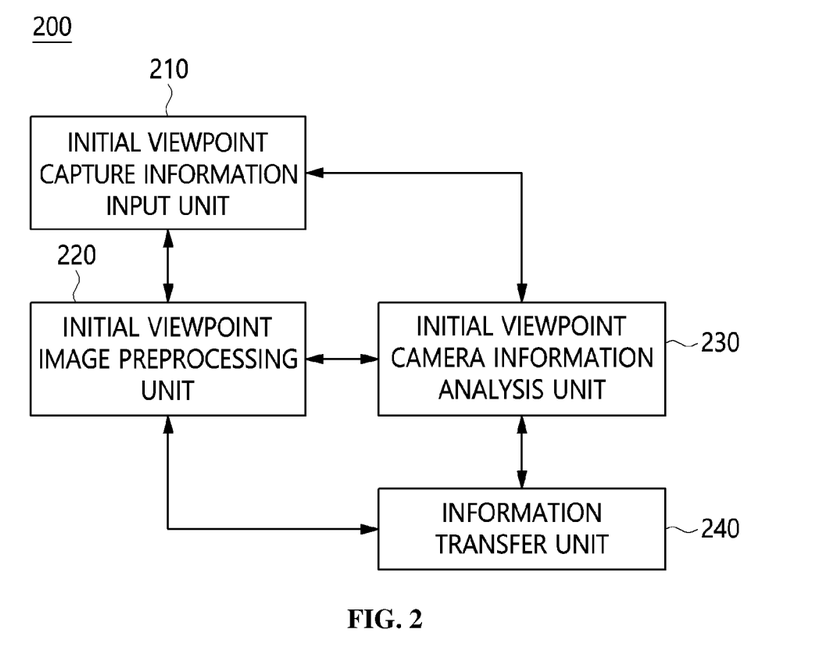
FIG. 2 is a block diagram illustrating in detail an example of the input unit illustrated in FIG. 1.
Figure 3:
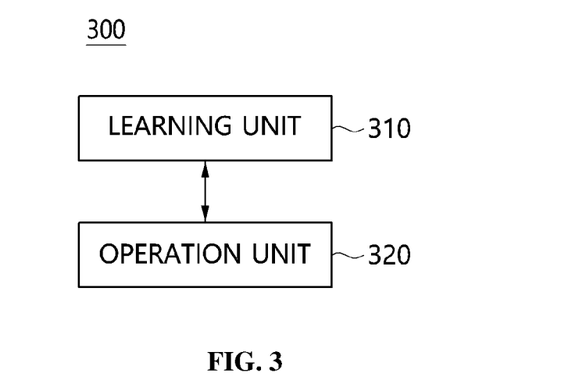
FIG. 3 is a block diagram illustrating in detail an example of the learning operation unit illustrated in FIG. 1.
Figure 4:
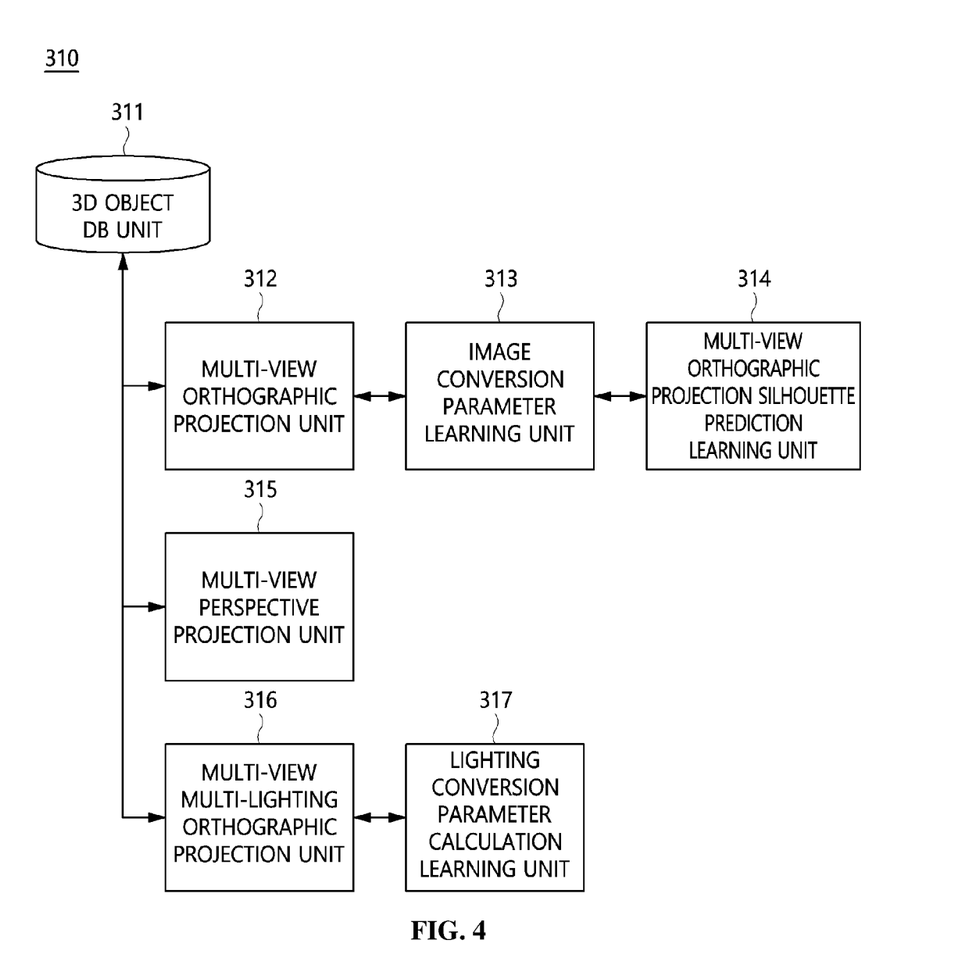
FIG. 4 is a block diagram illustrating in detail an example of the learning unit illustrated in FIG. 3.
Figure 5:
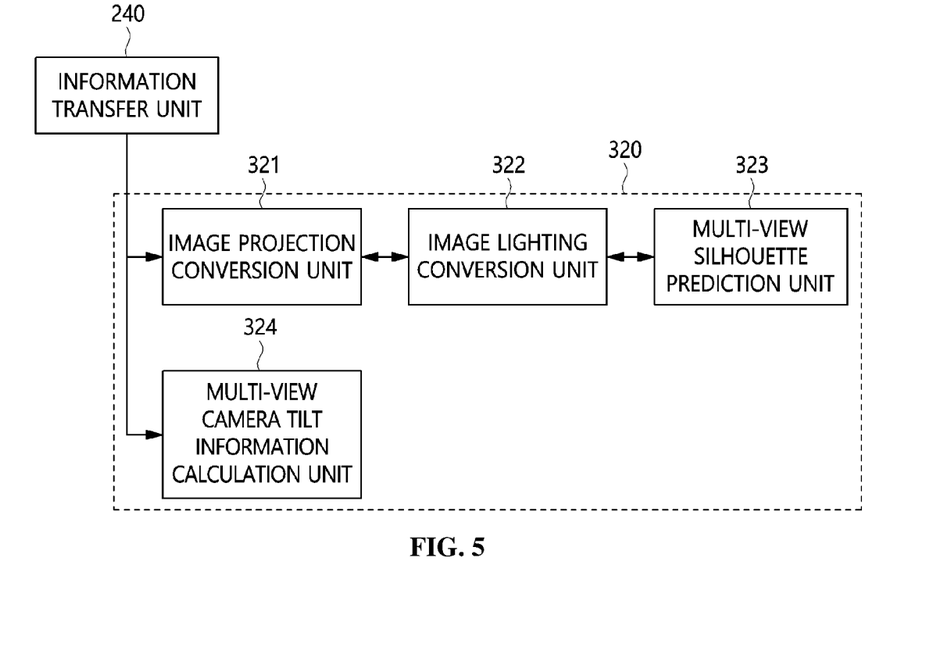
FIG. 5 is a block diagram illustrating in detail an example of the operation unit illustrated in FIG. 3.
Figure 6:
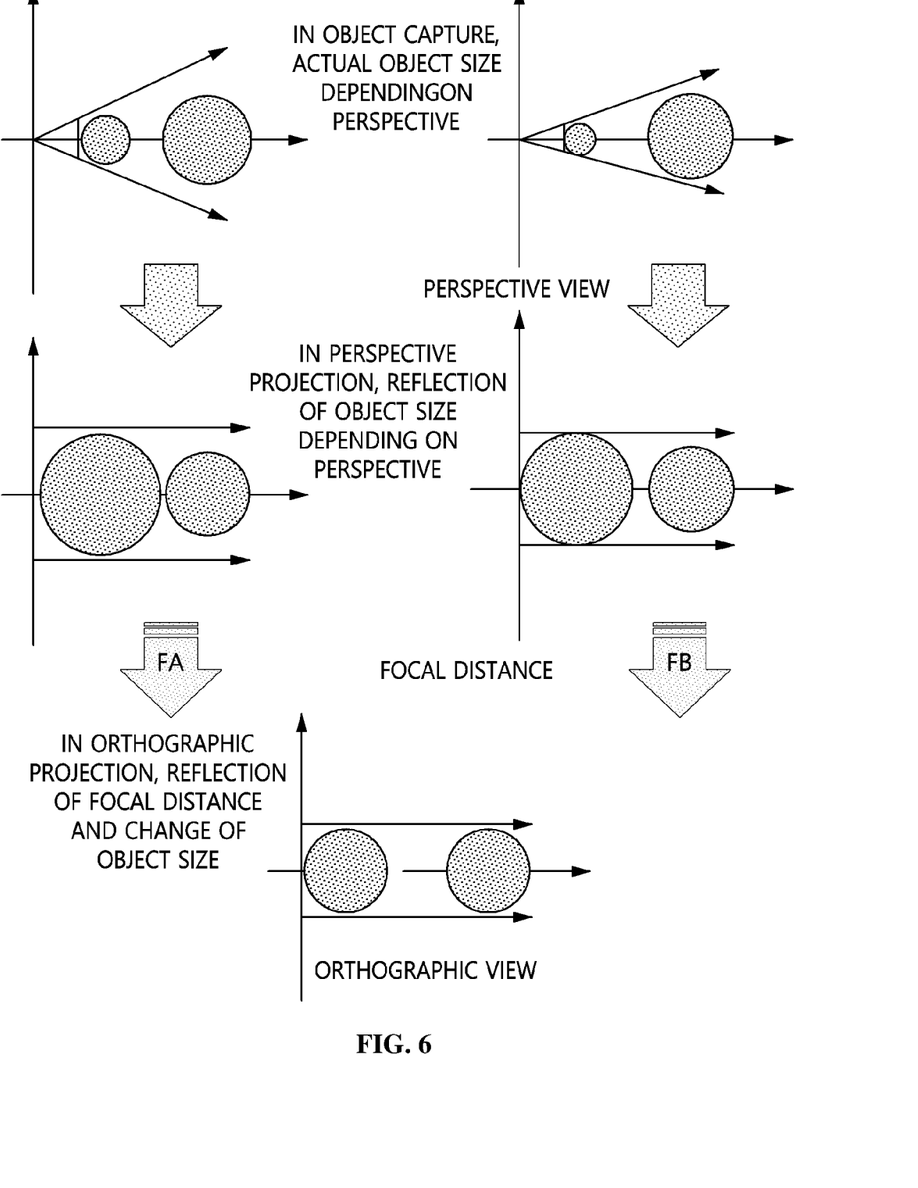
FIG. 6 is a diagram illustrating a projection image conversion procedure according to an embodiment of the present invention.
Figure 7:
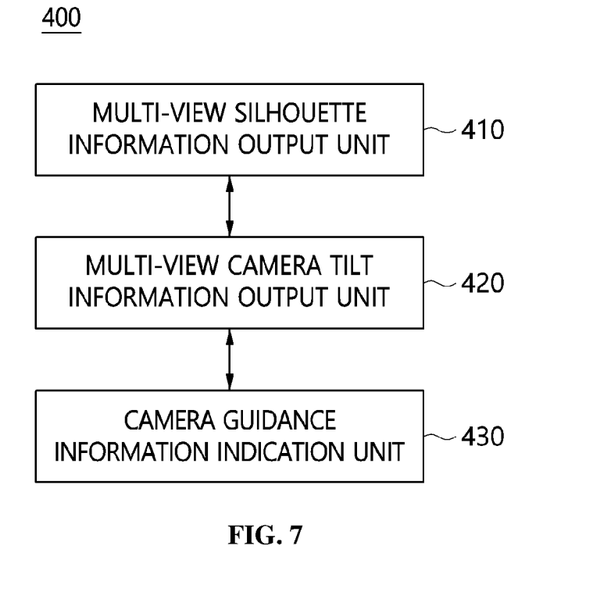
FIG. 7 is a block diagram illustrating in detail an example of the output unit illustrated in FIG. 1.

FIG. 1 is a block diagram illustrating an apparatus for guiding multi-view capture according to an embodiment of the present invention. FIG. 2 is a block diagram illustrating in detail an example of the input unit illustrated in FIG. 1. FIG. 3 is a block diagram illustrating in detail an example of the learning operation unit illustrated in FIG. 1. FIG. 4 is a block diagram illustrating in detail an example of the learning unit illustrated in FIG. 3. FIG. 5 is a block diagram illustrating in detail an example of the operation unit illustrated in FIG. 3. FIG. 6 is a diagram illustrating a projection image conversion procedure according to an embodiment of the present invention. FIG. 7 is a block diagram illustrating in detail an example of the output unit illustrated in FIG. 1.

Referring to FIG. 1, an apparatus 100 for guiding multi-view capture (which may also be referred to as a "multi-view capture guidance apparatus 100") according to an embodiment of the present invention includes an input unit 200, a learning operation (learning computation) unit 300, and an output unit 400.

The input unit 200 may receive multi-view 2D images obtained by capturing an image of an object of interest through a camera.

Here, the input unit 200 may receive each single-view 2D image captured by the camera and separate the single-view 2D image into the object of interest and a background.

Referring to FIG. 2, the input unit 200 may include an initial viewpoint (view) capture information input unit 210, an initial viewpoint image preprocessing unit 220, an initial viewpoint camera information analysis unit 230, and an information transfer unit 240.

The initial viewpoint capture information input unit 210 may receive a single-view 2D image captured by the camera.

The initial viewpoint image preprocessing unit 220 may separate the single-view 2D image into a foreground, which is an object of interest, and a background.

The initial viewpoint camera information analysis unit 230 may analyze the tilt degree value and the tilt direction value of the camera from a single view based on single-view camera information.

The tilt may include the movement in vertical direction and the movement in horizontal direction, and the movement of the tilt can be in any direction. The tilt may be inclination or leaning in any direction.

The information transfer unit 240 may transfer an image of the object of interest to the learning operation unit 300.

The learning operation unit 300 may learn image conversion parameters, multi-view orthographic projection silhouette prediction parameters, and lighting conversion parameters from multi-view 2D images, may generate an orthographic projection image and a perspective projection image for the object of interest from the single-view 2D image using the previously learned image conversion parameters, multi-view orthographic projection silhouette prediction parameters, and lighting conversion parameters, and may then generate a 3D silhouette model for the object of interest using the orthographic projection image and the perspective projection image.

The learning operation unit 300 may receive multi-view 2D images of the object of interest through the camera, may learn conversion parameters between projection images, learn prediction of a multi-view orthographic projection silhouette, and learn lighting, and may then generate learning parameters.

The learning operation unit 300 may perform silhouette guidance for respective viewpoints suitable for precise measurement and 3D reconstruction and calculate the tilt direction value and the tilt degree value of the camera in real time based on initial viewpoint image information and the camera gyroscope information which are received from the input unit 200, and may then generate guidance information.

The learning operation unit 300 may predict a multi-view silhouette from an orthographic projection front image (i.e., a single-view orthographically projected front image) using the previously learned orthographic projection silhouette prediction parameters.

The learning operation unit 300 may convert the predicted multi-view orthographic projection silhouette into a perspective projection silhouette so as to display the predicted multi-view orthographic projection silhouette on the camera.

Here, the learning operation unit 300 may display a multi-view silhouette image projected in perspective under a viewpoint-adjusted lighting environment, generated by inferring conversion of lighting or the like, on the display, thus guiding the multi-view silhouette image projected in perspective.

Referring to FIG. 3, the learning operation unit 300 may include a learning unit 310 and an operation unit 320.

The learning unit 310 may perform offline learning to generate a 3D silhouette model for multi-view 2D images.

Referring to FIG. 4, the learning unit 310 may include a 3D object database (DB) unit 311, a multi-view orthographic projection unit 312, an image conversion parameter learning unit 313, a multi-view orthographic projection silhouette prediction learning unit 314, a multi-view perspective projection unit 315, a multi-view multi-lighting orthographic projection unit 316, and a lighting conversion parameter calculation learning unit 317.

The 3D object DB unit 311 may collect various 3D objects and then construct and store learning data about various 3D objects in advance.

The multi-view orthographic projection unit 312 may render an image, such as a plan view, in which the relative size of an object suitable for 3D reconstruction can be known.

The image conversion parameter learning unit 313 may predict a field of view (FOV) angle, and may then convert input perspective projection information into orthographic projection information.

The multi-view orthographic projection silhouette prediction learning unit 314 may predict and learn a 360° multi-view orthographic projection silhouette relative to a converted orthographic projection image from an initial viewpoint.

The multi-view perspective projection unit 315 may render various perspective projection images corresponding to various field of view (FOV) angles.

The multi-view multi-lighting orthographic projection unit 316 may perform multi-view multi-lighting orthographic projection for each object in order to remove the influence of various lighting environments when an actual image is captured.

The lighting conversion parameter calculation learning unit 317 may calculate lighting conversion parameters between orthographic projection images in an unlit environment (i.e., an environment without lighting) for respective viewpoints and orthographic projection images in a multi-lighting environment for respective corresponding viewpoints.

The operation unit 320 may receive the information transferred from the information transfer unit 240, and may generate, online, a 3D silhouette model from the multi-view 2D images using the image conversion parameters and the lighting conversion parameters previously learned by the learning unit 310.

Referring to FIG. 5, the operation unit 320 may include an image projection conversion unit 321, an image lighting conversion unit 322, a multi-view silhouette prediction unit 323, and a multi-view camera tilt information calculation unit 324.

The image projection conversion unit 321 may convert a perspective projection image for a single-view 2D image into an orthographic projection image using the previously learned image conversion parameters.

The image lighting conversion unit 322 may convert the lighting value of the input single-view 2D image into a lighting value falling within a preset difference range using the previously learned lighting conversion parameters.

The multi-view silhouette prediction unit 323 may predict silhouettes from the remaining views (viewpoints) based on the silhouette of the input single-view 2D image using the previously learned multi-view orthographic projection silhouette prediction parameters.

The multi-view camera tilt information calculation unit 324 may calculate the tilt degree value and the tilt direction value of the camera using camera gyroscope information.

Referring to FIG. 6, it can be seen that the learning operation unit 300 learns prediction of focal distance parameters corresponding to respective FOV angles by learning conversion into orthographic projection images corresponding to perspective projection images from perspective views at various FOV angles.

Here, the learning operation unit 300 may generate an orthographic view image of an object of interest, the object size of which has been changed, by reflecting a focal distance in the object of interest contained in each perspective projection image.

The output unit 400 may output the 3D silhouette model and a guidance interface for the 3D silhouette model.

Here, the output unit 400 may output and display, in real time, the guidance information generated by the learning operation unit 300 via the display.

Referring to FIG. 7, the output unit 400 may include a multi-view silhouette information output unit 410, a multi-view camera tilt information output unit 420, and a camera guidance information indication unit 430.

The multi-view silhouette information output unit 410 may output information about a 3D silhouette model that is predicted in real time.

The multi-view camera tilt information output unit 420 may output information about tilt degree values and tilt direction values of the camera for respective real-time viewpoints depending on the camera motion.

The camera guidance information indication unit 430 may output the guidance interface for the 3D silhouette model based on the tilt degree values and the tilt direction values of the camera.

Here, the input unit 200, the learning operation unit 300, and the output unit 400 may be included in an internal guidance processing unit 500.

Figure 8:
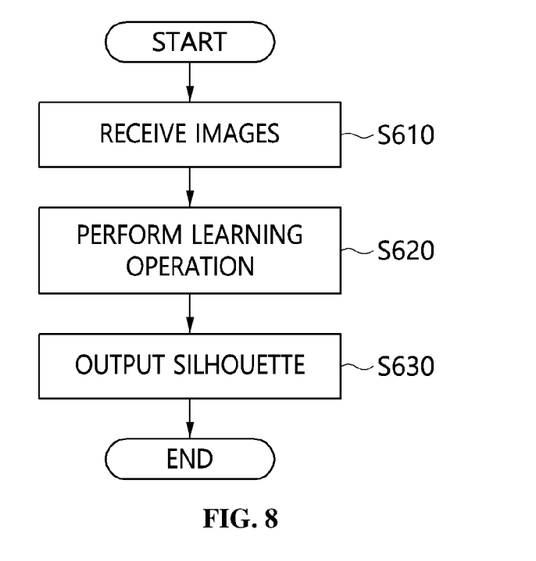
FIG. 8 is an operation flowchart illustrating a method for guiding multi-view capture according to an embodiment of the present invention.

FIG. 8 is an operation flowchart illustrating a method for guiding multi-view capture according to an embodiment of the present invention.

Referring to FIG. 8, the method for guiding multi-view capture according to the embodiment of the present invention may receive multi-view 2D images at step S610.

That is, at step S610, the multi-view 2D images, obtained by capturing an image of an object of interest through a camera, may be received.

Further, at step S610, the single-view 2D image captured by the camera may be received, and may be separated into the object of interest and a background.

Here, at step S610, the single-view 2D image captured by the camera may be received.

At step S610, the single-view 2D image may be separated into a foreground, which is the object of interest, and a background.

Here, at step S610, the tilt degree value and the tilt direction value of the camera from a single view may be analyzed based on single-view camera information.

Next, the method for guiding multi-view capture according to the embodiment of the present invention may generate a 3D silhouette model from the multi-view 2D images through a learning operation at step S620.

That is, at step S620, image conversion parameters, multi-view orthographic projection silhouette prediction parameters, and lighting conversion parameters may be learned from multi-view 2D images, an orthographic projection image and a perspective projection image for the object of interest may be generated from the single-view 2D image using the previously learned image conversion parameters, multi-view orthographic projection silhouette prediction parameters, and lighting conversion parameters, and then a 3D silhouette model for the object of interest may be generated using the orthographic projection image and the perspective projection image.

Here, at step S620, the multi-view 2D images of the object of interest may be received through the camera, conversion parameters between projection images may be learned, and prediction of a multi-view orthographic projection silhouette may be learned, and lighting may be learned, and thus learning parameters may be generated.

Here, at step S620, a multi-view silhouette may be predicted from an orthographic projection front image (i.e., a single-view orthographically-projected front image) using the previously learned orthographic projection silhouette prediction parameters.

Here, at step S620, the predicted multi-view orthographic projection silhouette may be converted back into a perspective projection silhouette so as to display the predicted multi-view orthographic projection silhouette on the camera.

Here, at step S620, a multi-view silhouette image projected in perspective under a viewpoint-adjusted lighting environment, generated by inferring conversion of lighting or the like, may be displayed on the display, and thus the multi-view silhouette image projected in perspective may be guided.

Here, at step S620, silhouette guidance for respective viewpoints suitable for precise measurement and 3D reconstruction may be performed and the tilt direction value and the tilt degree value of the camera may be calculated in real time based on initial viewpoint image information and camera gyroscope information which are received, and then guidance information may be generated.

At step S620, offline learning may be performed to generate a 3D silhouette model for multi-view 2D images.

At step S620, various 3D objects may be collected and then learning data may be constructed and stored in advance.

Here, at step S620, an image, such as a plan view in which the relative size of an object suitable for 3D reconstruction can be known, may be rendered.

Here, at step S620, a field of view (FOV) angle may be predicted, and input perspective projection information may then be converted into orthographic projection information.

Here, at step S620, a 360° multi-view orthographic projection silhouette relative to a converted orthographic projection image at an initial viewpoint may be predicted and learned.

Here, at step S620, various perspective projection images corresponding to various field of view (FOV) angles may be rendered.

Here, at step S620, multi-view multi-lighting orthographic projection for each object may be performed in order to remove the influence of various lighting environments when an actual image is captured.

At step S620, lighting conversion parameters between orthographic projection images in an unlit environment for respective viewpoints and orthographic projection images in a multi-lighting environment for respective corresponding viewpoints may be calculated.

At step S620, transferred information may be received, and a 3D silhouette model may be generated online from the multi-view 2D images using the previously learned image conversion parameters and lighting conversion parameters.

Here, at step S620, a perspective projection image for a single-view 2D image may be converted into an orthographic projection image using the previously learned image conversion parameters.

Here, at step S620 the lighting value of the input single-view 2D image may be converted into a lighting value falling within a preset difference range using the previously learned lighting conversion parameters.

Further, at step S620, silhouettes from the remaining views (viewpoints) may be predicted based on the silhouette of the input single-view 2D image using the previously learned multi-view orthographic projection silhouette prediction parameters.

Here, at step S620, the tilt degree value and the tilt direction value of the camera may be calculated using the camera gyroscope information.

At step S620, as illustrated in FIG. 6, it can be seen that prediction of focal distance parameters corresponding to respective FOV angles is learned by learning conversion into orthographic projection images corresponding to perspective projection images from perspective views at various FOV angles.

Here, at step S620, an orthographic view image of the object of interest, the object size of which has been changed, may be generated by reflecting a focal distance in the object of interest contained in each perspective projection image.

Also, the method for guiding multi-view capture according to an embodiment of the present invention may output a 3D silhouette model and a guidance interface at step S630.

That is, at step S630, the 3D silhouette model and the guidance interface for the 3D silhouette model may be output.

Here, at step S630, the generated guidance information may be output and indicated via the display.

At step S630, information about the 3D silhouette model predicted in real time may be output.

Here, at step S630, information about tilt degree values and tilt direction values of the camera for respective real-time viewpoints depending on the camera motion may be output.

Here, at step S630, the guidance interface for the 3D silhouette model may be output based on the tilt degree values and the tilt direction values of the camera.

Figure 9:
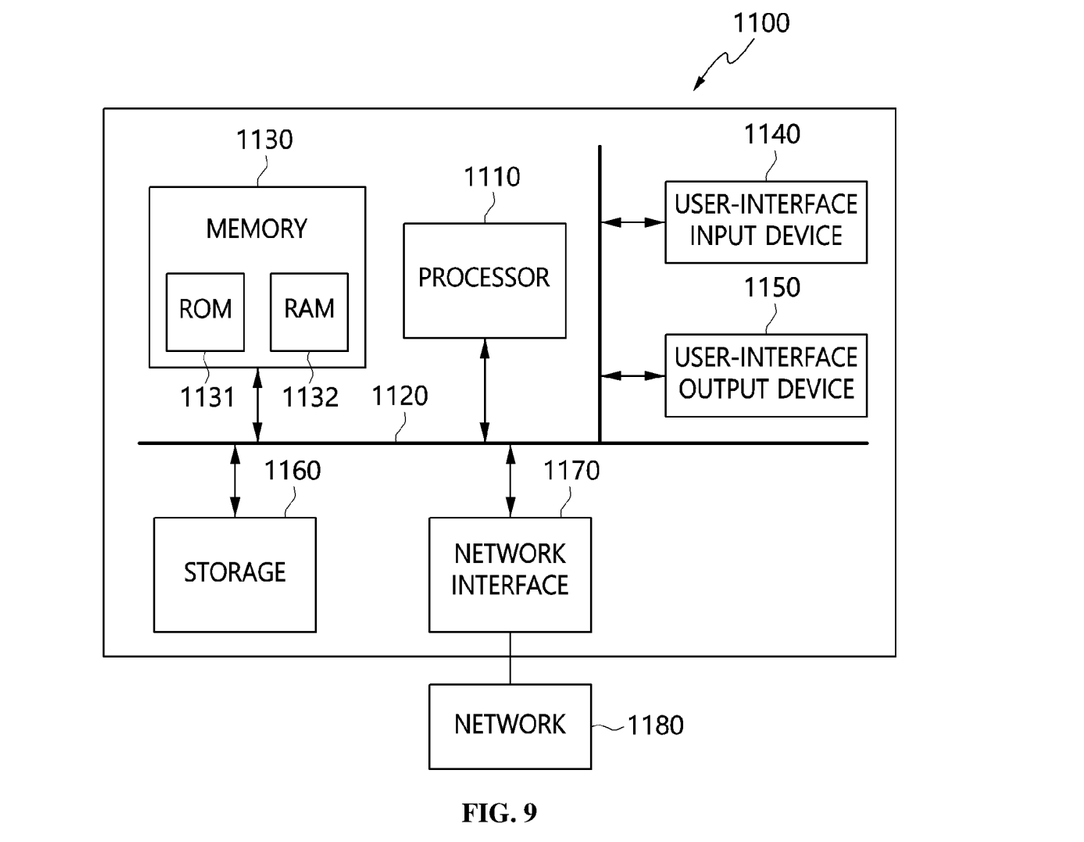
FIG. 9 is a block diagram illustrating a computer system according to an embodiment of the present invention.

FIG. 9 is a diagram illustrating a computer system according to an embodiment of the present invention.

Referring to FIG. 9, the apparatus 100 for guiding multi-view capture according to an embodiment of the present invention may be implemented in a computer system 1100, such as a computer-readable storage medium. As illustrated in FIG. 9, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

Here, the apparatus for guiding multi-view capture according to an embodiment of the resent invention may include one or more processors 1110 and execution memory 1130 for storing at least one program that is executed by the one or more processors 1110, wherein the at least one program is configured to receive a single-view two-dimensional (2D) image, obtained by capturing an image of an object of interest through a camera, generate an orthographic projection image and a perspective projection image for the object of interest from the single-view 2D image using an image conversion parameter that is previously learned from multi-view 2D images for the object of interest, generate a 3D silhouette model for the object of interest using the orthographic projection image and the perspective projection image, and output the 3D silhouette model and a guidance interface for the 3D silhouette model.

Here, the at least one program may be configured to receive multi-view 2D images of the object of interest through the camera, may learn a conversion parameter between projection images, learn prediction of a multi-view orthographic projection silhouette, and learn lighting, and may then generate learning parameters.

Here, the at least one program is configured to predict silhouettes of 2D images from remaining views based on the single-view 2D image using a multi-view silhouette prediction parameter that is previously learned from the multi-view 2D images for the object of interest, and to generate the 3D silhouette model using the predicted silhouettes.

Here, the at least one program may be configured to predict a multi-view silhouette from an orthographic projection front image (i.e., a single-view orthographically-projected front image) using an orthographic projection silhouette prediction parameter that is previously learned from the multi-view 2D images for the object of interest.

Here, the at least one program may be configured to convert the predicted multi-view orthographic projection silhouette back into a perspective projection silhouette so as to display the predicted multi-view orthographic projection silhouette on the camera.

Here, the at least one program may be configured to display a multi-view silhouette image projected in perspective under a viewpoint-adjusted lighting environment, generated by inferring conversion of lighting or the like, on the display, thus guiding the multi-view silhouette image projected in perspective.

Here, the at least one program may be configured to correct a lighting value of the single-view 2D image to a lighting value falling within a preset difference range using a lighting conversion parameter that is previously learned from the multi-view 2D images for the object of interest.

Here, the at least one program may be configured to calculate a tilt degree value and a tilt direction value of the camera using gyroscope information of the camera.

Here, the at least one program may be configured to output the guidance interface for the 3D silhouette model based on the tilt degree value and the tilt direction value of the camera.

The present invention may measure the appearance of an object of interest, precisely measure the object of interest, and provide 3D reconstruction from an image acquired through a camera.

Further, the present invention may provide a method and apparatus for guiding capture from other viewpoints based on the viewpoint of an initially captured image.

Furthermore, the present invention may support capture guidance so that a user can easily and accurately capture a multi-view image through capture guidance.

Furthermore, the present invention may improve multi-view capture-guiding performance based on machine learning.

As described above, in the apparatus and method for guiding multi-view capture according to the present invention, the configurations and schemes in the above-described embodiments are not limitedly applied, and some or all of the above embodiments can be selectively combined and configured such that various modifications are possible.

What is claimed is:

1. An apparatus for guiding multi-view capture for 3D reconstruction, comprising:
    one or more processors; and an execution memory for storing at least one program that is executed by the one or more processors, wherein the at least one program is configured to receive a single-view two-dimensional (2D) image of an object of interest, generate an orthographic projection image and a perspective projection image for the object of interest from the single-view 2D image using an image conversion parameter that is previously learned, predict silhouettes of 2D images from different views using the orthographic projection image, the perspective projection image, and a multi-view silhouette prediction parameter that is previously learned, generate a 3D silhouette model for the object of interest using silhouettes of 2D images, and output a guidance interface for multi-view capture including the 3D silhouette model.

2. The apparatus of claim 1, wherein the at least one program is configured to correct a lighting value of the single-view 2D image to a lighting value falling within a preset difference range using a lighting conversion parameter that is previously learned from the multi-view 2D images for the object of interest.

3. The apparatus of claim 1, wherein the at least one program is configured to calculate a tilt degree value and a tilt direction value of a camera using gyroscope information of the camera.

4. The apparatus of claim 3, wherein the at least one program is configured to output the guidance interface for the 3D silhouette model based on the tilt degree value and the tilt direction value of the camera.

5. A method for guiding multi-view capture for 3D reconstruction, the method being performed by an apparatus for guiding multi-view capture, the method comprising:

receiving a single-view 2D image of an object of interest;

generating an orthographic projection image and a perspective projection image for the object of interest from the single-view 2D image using a conversion parameter that is previously learned;

predicting silhouettes of 2D images from different views using the orthographic projection image, the perspective projection image, and a multi-view silhouette prediction parameter that is previously learned;

generating a 3D silhouette model for the object of interest using silhouettes of 2D images; and outputting a guidance interface for multi-view capture including the 3D silhouette model.

6. The method of claim 5, wherein generating the 3D silhouette model is configured to correct a lighting value of the single-view 2D image to a lighting value falling within a preset difference range using a lighting conversion parameter that is previously learned from the multi-view 2D images for the object of interest.

7. The method of claim 5, wherein generating the 3D silhouette model is configured to calculate a tilt degree value and a tilt direction value of a camera using gyroscope information of the camera.

8. The method of claim 7, wherein outputting the 3D silhouette model and the guidance interface is configured to output the guidance interface for the 3D silhouette model based on the tilt degree value and the tilt direction value of the camera.

* * * * *